(12) United States Patent
Mudge et al.

(10) Patent No.: US 8,717,573 B1
(45) Date of Patent: May 6, 2014

(54) TUNABLE INTERFEROMETRIC SCANNING SPECTROMETER

(75) Inventors: Jason D. Mudge, Los Altos, CA (US); Christopher W. Tischhauser, San Mateo, CA (US); Gregory S. Feller, Kentfield, CA (US); James Wes Irwin, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 424 days.

(21) Appl. No.: 13/039,254

(22) Filed: Mar. 2, 2011

Related U.S. Application Data

(60) Provisional application No. 61/311,051, filed on Mar. 5, 2010.

(51) Int. Cl.
*G01B 9/02* (2006.01)
*G01J 3/45* (2006.01)

(52) U.S. Cl.
USPC .......................................................... 356/455

(58) Field of Classification Search
USPC .......................... 356/450, 451, 452, 455, 456
See application file for complete search history.

(56) References Cited

U.S. PATENT DOCUMENTS

| | | | |
|---|---|---|---|
| 6,816,315 B1 * | 11/2004 | Ai et al. | 359/637 |
| 7,499,175 B1 * | 3/2009 | Palmer et al. | 356/450 |
| 2002/0154314 A1 * | 10/2002 | Copner et al. | 356/450 |

OTHER PUBLICATIONS

Weisstein, Eric W., Millimeter/Submillimeter Fourier Transform Spectroscopy of Jovian Planet Atmospheres, California Institute of Technology, 1996.*
Witte, S. et al., Single-shot two-dimensional full-range optical coherence tomography achieved by dispersion control, Optics Express, vol. 17, No. 14 (Jul. 6, 2009), pp. 11335-11349.*
Hearn, D.R., Fourier Transform Interferometry, Technical Report 1053, Lincoln Laboratory, MIT, Oct. 29, 1999.*

* cited by examiner

*Primary Examiner* — Michael A Lyons
(74) *Attorney, Agent, or Firm* — McDermott Will & Emery LLP (57) ABSTRACT

A tunable interferometric scanning spectrometer is provided. In one aspect of the disclosure, the interferometric scanning spectrometer splits incoming light beams among different optical paths in the spectrometer, recombines the light beams from the different optical paths to produce combined light beams, detects intensities of the combined light beams across a focal plane (e.g., with a sensor array), and calculates a spectra based on the detected intensities and a filter function that is a function of optical path difference (OPD) between the optical paths. In one aspect, the filter function varies across the focal plane. In another aspect, the spectrometer comprises a rotatable dispersive element (e.g., glass plate) in one the optical paths and/or a moveable mirror in the other optical path. In this aspect, the spectrometer may be adjusted away from zero OPD by rotation of the dispersive element and/or displacement of the mirror.

20 Claims, 10 Drawing Sheets

TUNABLE INTERFEROMETRIC SCANNING SPECTROMETER

CROSS-REFERENCE TO RELATED APPLICATION

The present application claims the benefit of priority under 35 U.S.C. §119 from U.S. Provisional Patent Application Ser. No. 61/311,051, entitled "INTERFEROMETRIC SCANNING SPECTROMETER," filed on Mar. 5, 2010, which is hereby incorporated by reference in its entirety for all purposes.

STATEMENT REGARDING FEDERALLY SPONSORED RESEARCH OR DEVELOPMENT

Not applicable.

FIELD

The present invention generally relates to spectrometers, and more particularly to interferometric scanning spectrometers.

BACKGROUND

Grating spectrometers are commonly used to analyze the spectral content of an object or scene. However, grating spectrometers typically have an undesirably low 1st order diffraction throughput (e.g., approximately 20%) averaged over the detected wavelengths. Further, grating spectrometers typically have an efficiency curve that is tuned around one wavelength.

SUMMARY OF THE INVENTION

In one aspect of the disclosure, a tunable interferometric scanning spectrometer is provided. The interferometric scanning spectrometer splits incoming light beams among two different optical paths in the spectrometer, recombines the light beams from the different optical paths to produce combined light beams, detects intensities of the combined light beams across a focal plane (e.g., with a sensor array), and calculates a spectra based on the detected intensities and a filter function that is a function of optical path difference (OPD) between the optical paths.

In one aspect, the spectrometer comprises a rotatable dispersive element (e.g., glass plate) in one of the optical paths. In this aspect, the OPD between the optical paths may be adjusted by rotation of the dispersive element.

In another aspect, the spectrometer comprises a moveable mirror in the other optical path. In this aspect, the OPD between the optical paths may be adjusted by displacement of the mirror.

In another aspect, each of the detected intensities corresponds to a different field angle. In this aspect, the spectrometer may calculate the spectra by multiplying the detected intensities with an inverse of a filter function matrix. The filter function matrix may be derived by calculating the filter function at different field angles and different wavelengths.

In another aspect, the filter function varies across the focal plane, resulting in coloring across the focal plane. In this aspect, the coloring is exploited to measure the spectra of an object or scene.

In another aspect, the coloring across the focal plane is mitigated by using piston shear to compensate for plate shear. In this aspect, the spectrometer may be used in applications (e.g., optical filter to block a broad range of wavelengths) where it may be desirable to mitigate the coloring across the focal plane.

In another aspect, the spectrometer can achieve higher spectral resolution over a small band by placing a band pass filter in front of the focal plane.

In another aspect, a hybrid spectrometer is provided that has the versatility of being used as either a scanning spectrometer or a Fourier spectrometer.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

DETAILED DESCRIPTION

Figure 1:
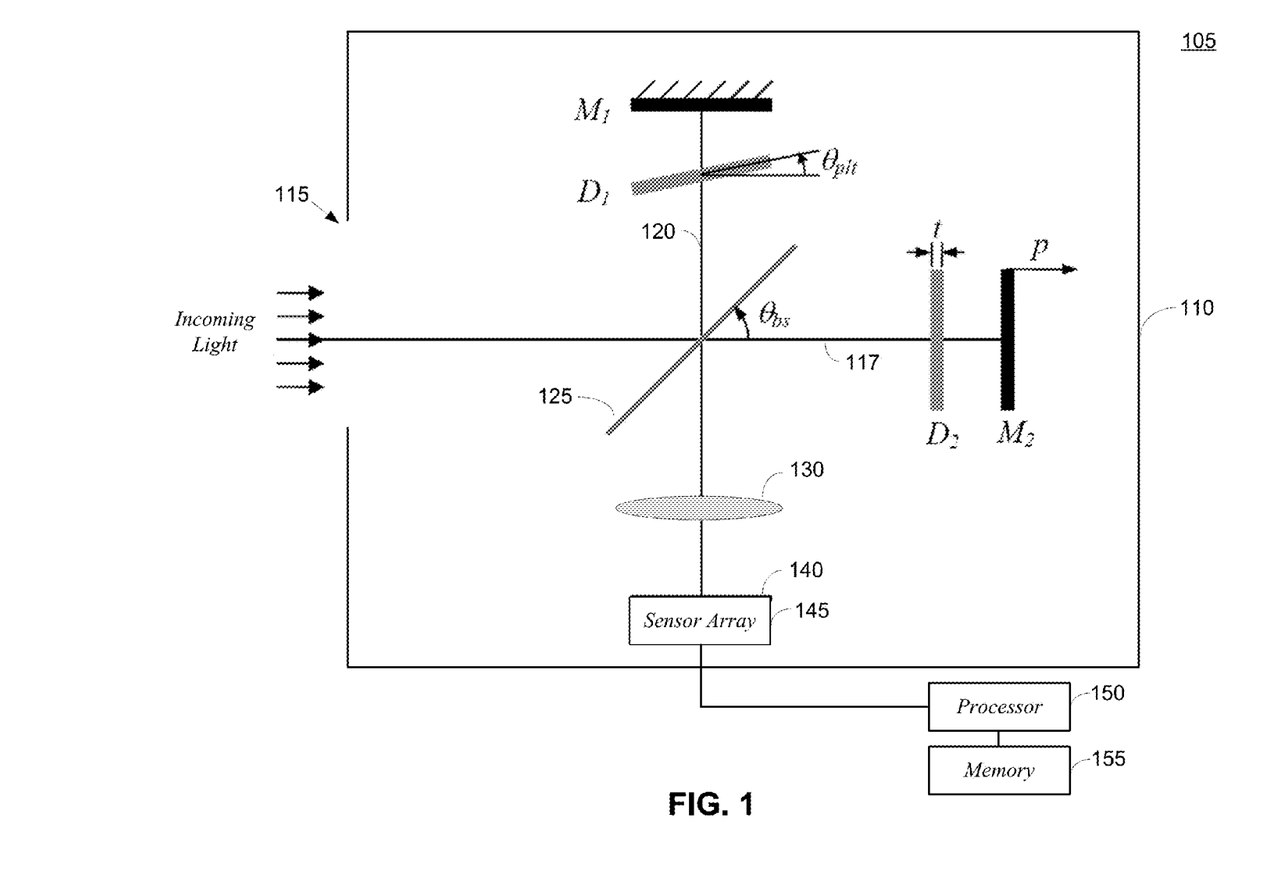
FIG. 1 is a conceptual diagram showing a tunable interferometric scanning spectrometer according to an aspect of the disclosure.

FIG. 1 shows a tunable interferometeric scanning spectrometer 105 according to an aspect of the disclosure. The interferometric scanning spectrometer 105 may be used, for example, to analyze the spectral content of an object to determine its chemical composition. The interferometric scanning spectrometer 105 may also be used in remote sensing applications to determine the spectra of a scene (e.g., atmosphere).

In one aspect, the interferometeric scanning spectrometer 105 comprises a housing 110 with an opening 115 for receiving incoming light beams from an object or scene that is within a field of view of the spectrometer. The field of view defines a range of field angles (e.g., −2.5 to 2.5 degrees) over which the spectrometer 105 receives incoming beams through the opening 115.

The spectrometer 105 also comprises a beam splitter 125, a lens 130 and a sensor array 145 aligned with a focal plane 140 of the spectrometer 105. The beam splitter 125 splits the incoming light beams into first and second light beams that propagate along first and second legs (optical paths) of the spectrometer 105, respectively.

In the first leg, the spectrometer 105 comprises a rotatable dispersive element $D_1$ and a mirror $M_1$. In one aspect, the dispersive element $D_1$ comprises a glass plate that may be rotated (e.g., using a knob) to a plate angle $\theta_{plt}$ with respect to the horizontal axis 117, as shown in FIG. 1. In this aspect, the terms dispersive element rotation and plate rotation may be used interchangeably. Thus, the first light beams pass through the dispersive element $D_1$ to the mirror $M_1$, which reflects the first light beams back through the dispersive element $D_1$ to the beam splitter 125.

In the second leg, the spectrometer 105 comprises another dispersive element $D_2$ (e.g., a glass plate) and another mirror $M_2$, which may be moved along the horizontal axis 117 of the spectrometer 105. In one aspect, the mirror $M_2$ is controllably moved along the horizontal axis 117 by a piston (not shown). In this aspect, the terms mirror displacement and piston displacement may be used interchangeably. Thus, the second light beams pass through the dispersive element $D_2$ to the mirror $M_2$, which reflects the second light beams back through the dispersive element $D_2$ to the beam splitter 125.

Figure 2:
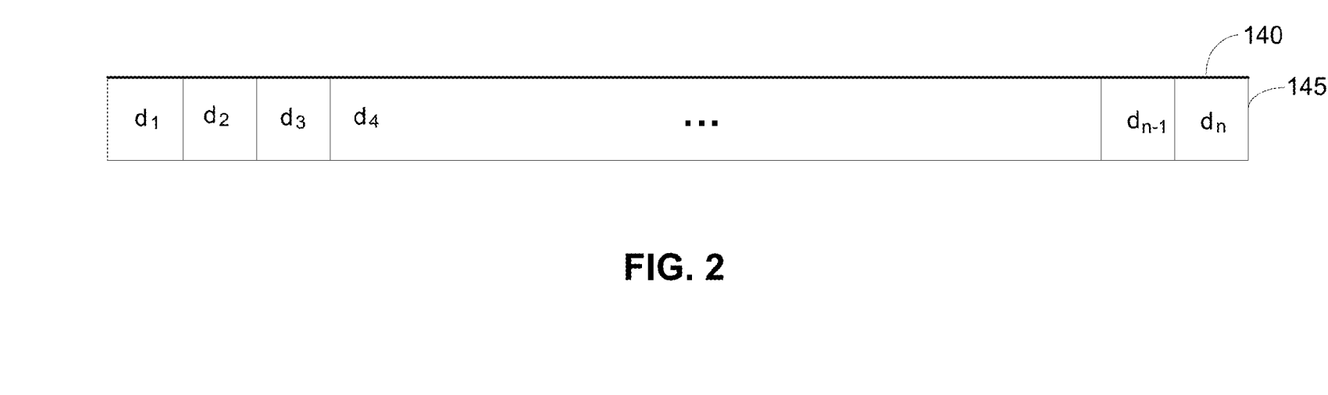
FIG. 2 shows a sensor array according to an aspect of the disclosure.

The beam splitter 125 combines the first and second light beams directed back to the beam splitter 125 into combined light beams, and directs the combined light beams to the lens 130. The lens 130 focuses the combined beams onto the focal plane 140. The sensor array 145 measures the intensities of the light beams impinging on the focal plane 140. As shown in FIG. 2, the sensor array 145 may comprise an array of photodetectors $d_1$ to $d_n$ (e.g., photo diodes, charge coupled devices, CMOS detectors, or other type of photodetectors), where each photodetector $d_1$ to $d_n$ detects intensity at a different location on the focal plane 140. Each location on the focal plane may correspond to a different field angle, and thus, each photodetector $d_1$ to $d_n$ may detect intensity for a different field angle.

The intensities detected across the focal plane 140 by the sensor array 145 are then inputted to a processor 150. The processor 150 computes a spectra of the object or scene based on the detected intensities and a filter function of the spectrometer, which is discussed in further detail below.

Although a beam splitter 125 is shown in the example in FIG. 1, those skilled in the art will appreciate that other optical structures may be used to split the incoming beams among the two legs (optical paths) of the spectrometer and to combine the beams from the two legs (optical paths) of the spectrometer.

In one aspect, the interferometric scanning spectrometer 105 has an associated filter function $f$ that determines the light intensity at the focal plane 140 as a function of the optical path difference (OPD) between the two legs (optical paths) of the spectrometer. The filter function $f$ may be expressed as follows:

$$f(OPD) = \tfrac{1}{2} + [1 + \cos(2\pi OPD)] \quad (1)$$

where it has been assumed that the intensity in each leg is identical and normalized. Equation (1) is referred to as the filter function because it filters light in the spectrometer 105 with respect to wavelength prior to detection by the sensor array 145 at the focal plane 140. When the object or scene is white, the filter function results in substantial coloring across the focal plane that can be detected with the sensor array 145. This phenomenon is exploited to estimate the spectra of an object or scene, as discussed further below.

In one aspect, the actual light intensity that impinges on a detector at the focal plane 140 is given by the filter function times the intensity of the source integrated over the detectable wavelength band of the detector. The filter function, as shown above, is a function of OPD. OPD, in turn, is a function of wavelength $\lambda$, field angle $\theta_{fa}$, beam splitter angle $\theta_{bs}$, plate angle $\theta_{plt}$ of the dispersive element $D_1$, and displacement $p$ of Mirror $M_2$, and may be expressed as:

$$OPD = \Im_a(\lambda, \theta_{fa}, \theta_{bs}, \theta_{plt}, p) \quad (2)$$

where $\Im_a$ is a known function. Zero OPD may correspond to the position of mirror $M_2$ and the angle of the dispersive element $D_1$ at which the optical path distance between the first and second legs is equal for all wavelengths. The displacement $p$ of mirror $M_2$ may be with respect to a position of mirror $M_2$ corresponding to zero OPD and the plate angle $\theta_{plt}$ may be with respect to an angle corresponding to zero OPD.

There are two main methods for adjusting the OPD: one associated with mirror (piston) displacement and another associated with dispersive element (plate) rotation.

The term associated with the mirror (piston) displacement can be further broken down into two terms: piston length change and a piston shear. The OPD terms associated with piston length change and piston shear as a function of field angle $\theta_{fa}$ are given respectively by:

$$OPD_{pstn_{plc}} = \frac{2p}{\cos(\theta_{fa})}, \quad (3)$$

and $$OPD_{pstn_{shr}} = \frac{2p}{\cos(\theta_{fa})}\left[\frac{\tan(\theta_{fa})}{\tan(\theta_{bs}) - \tan(\theta_{fa})\operatorname{sgn}(\theta_{fa})}\right] \quad (4)$$

The total $OPD_{pstn}$ associated with piston displacement is given by:

$$OPD_{pstn} = \quad (5)$$
$$OPD_{pstn_{plc}} + OPD_{pstn_{shr}} = \frac{2p}{\cos(\theta_{fa})}\left[1 - \frac{\tan(\theta_{fa})}{\tan(\theta_{bs}) + \tan(\theta_{fa})\operatorname{sgn}(\theta_{fa})}\right]$$

The piston length change is $2p$ for a field angle of zero ($\theta_{fa} = 0°$) and increases as the field angle increases.

Figure 3:
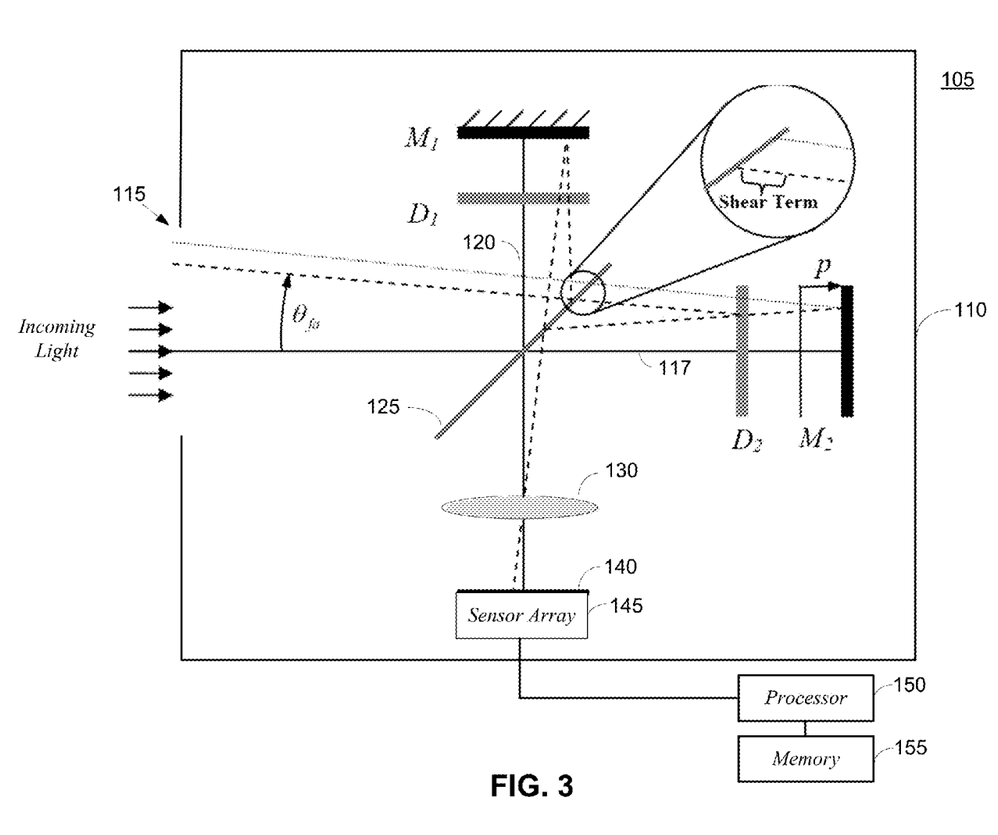
FIG. 3 illustrates piston shear according to an aspect of the disclosure.

Referring to FIG. 3, the piston shear comes about as a result of an off axis beam (dashed line) not being interfered exactly with itself but actually with the next beam (dotted line) over due to mirror displacement (piston). The next beam enters the spectrometer at a slightly different position on the beam splitter 125 resulting in the "shear" term shown in FIG. 3. The piston shear is zero when the field angle is zero. The field angle $\theta_{fa}$ of an incoming beam is with respect to the horizontal axis 117 in the example shown in FIG. 3.

The term associated with dispersive element (plate) rotation may be further broken down into three terms: plate shear, plate dispersion path change, and plate air path change. The OPD terms associated with plate shear, plate dispersion path change, and plate air path change as a function of field angle are given respectively by:

$$OPD_{plt_{shr}} = \Delta \frac{\sin\theta_{bs}}{\cos(\theta_{bs} - \theta_{fa})}, \quad (6)$$

$$OPD_{plt_{pdp}} = n_{plt} t \left[ \frac{1}{\cos\varphi_1^0} - \frac{1}{\cos\varphi_1} + \frac{1}{\cos\varphi_2^0} - \frac{1}{\cos\varphi_2} \right], \quad (7)$$

and $$OPD_{plt_{pap}} = -\frac{t}{\cos\theta_{fa}} \left[ 1 - \cos\theta_{plt} - \frac{\sin\theta_{plt}\sin(-\theta_{fa} + \theta_{plt})}{\sqrt{n_{plt} - \sin^2(-\theta_{fa} + \theta_{plt})}} \right] \quad (8)$$

where $$\Delta = t \left[ \frac{\cos(+\theta_{fa} + \theta_{plt})}{\cos(+\theta_{fa})} (\tan(+\theta_{fa} + \theta_{plt}) - \tan\varphi_1) - (\tan(+\theta_{fa}) - \tan\varphi_1^0) \right] -$$
$$t \left[ \frac{\cos(-\theta_{fa} + \theta_{plt})}{\cos(-\theta_{fa})} (\tan(-\theta_{fa} + \theta_{plt}) - \tan\varphi_2) - \right.$$
$$\left. (\tan(-\theta_{fa}) - \tan\varphi_2^0) \right],$$

Figure 4:
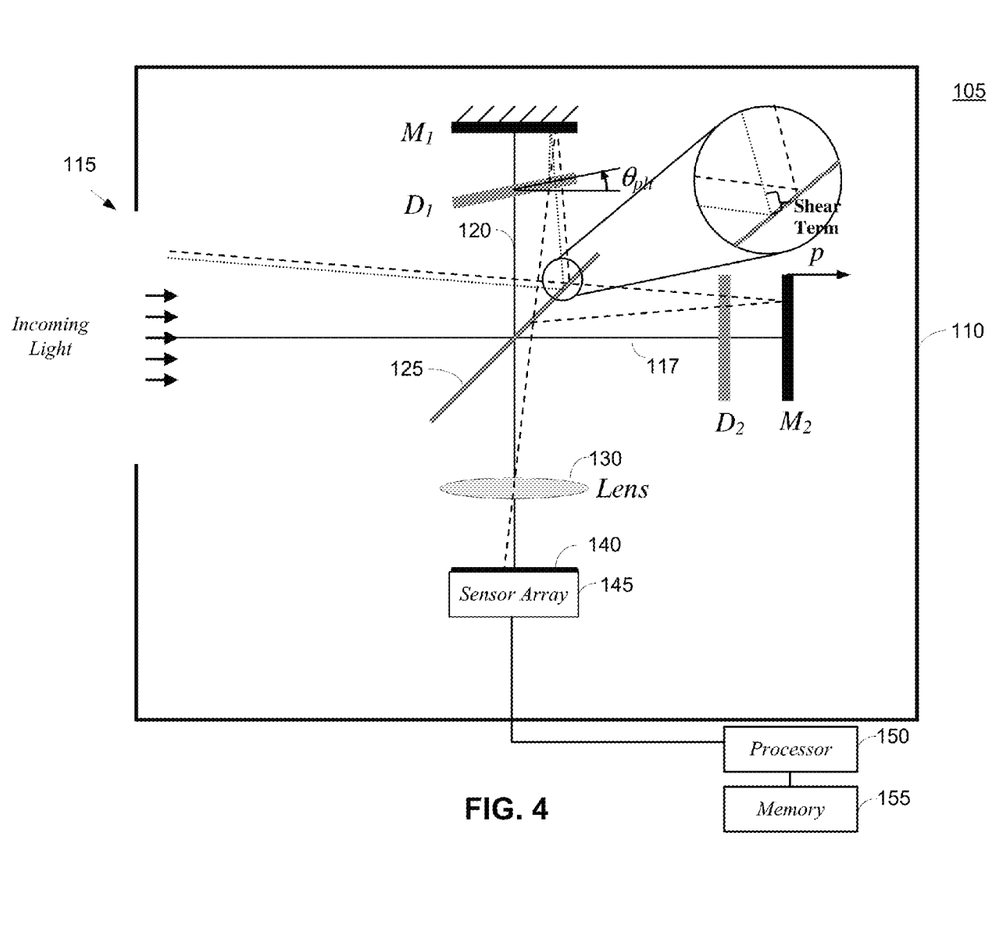
FIG. 4 illustrates plate shear according to an aspect of the disclosure.

$\sin(+\theta_{fa}) = n_{plt}\sin(\varphi_1^0)$, $\sin(+\theta_{fa} + \theta_{plt}) = n_{plt}\sin(\varphi_1)$, $\sin(-\theta_{fa}) = n_{plt}\sin(\varphi_2^0)$, and $\sin(-\theta_{fa} + \theta_{plt}) = n_{plt}\sin(\varphi_2)$ The plate shear is similar to piston shear. Referring to FIG. 4, the plate shear comes about as a result of an off axis beam (dashed line) not being interfered exactly with itself but actually with the next beam (dotted line) over due to dispersion element (plate) rotation. The plate dispersion path change is related to the field angle through the plate angle $\theta_{plt}$ of dispersive element $D_1$, and the plate air path change deals with change air path length when the dispersive element (plate) is rotated.

The total $OPD_{plt}$ associated with plate rotation is given by:

$$OPD_{plt} = OPD_{plt_{shr}} + OPD_{plt_{pdp}} + OPD_{plt_{pap}} \quad (9)$$

Finally, the total OPD is obtained by combining the total OPD associated with piston displacement and the total OPD associated with plate rotation, and is given by:

$$OPD = OPD_{pstn} + OPD_{plt} \quad (10)$$

Equation (10) for the total OPD can then be inserted into the Equation (1) to create the filter function for the interferometric scanning spectrometer 105.

Figure 5A:
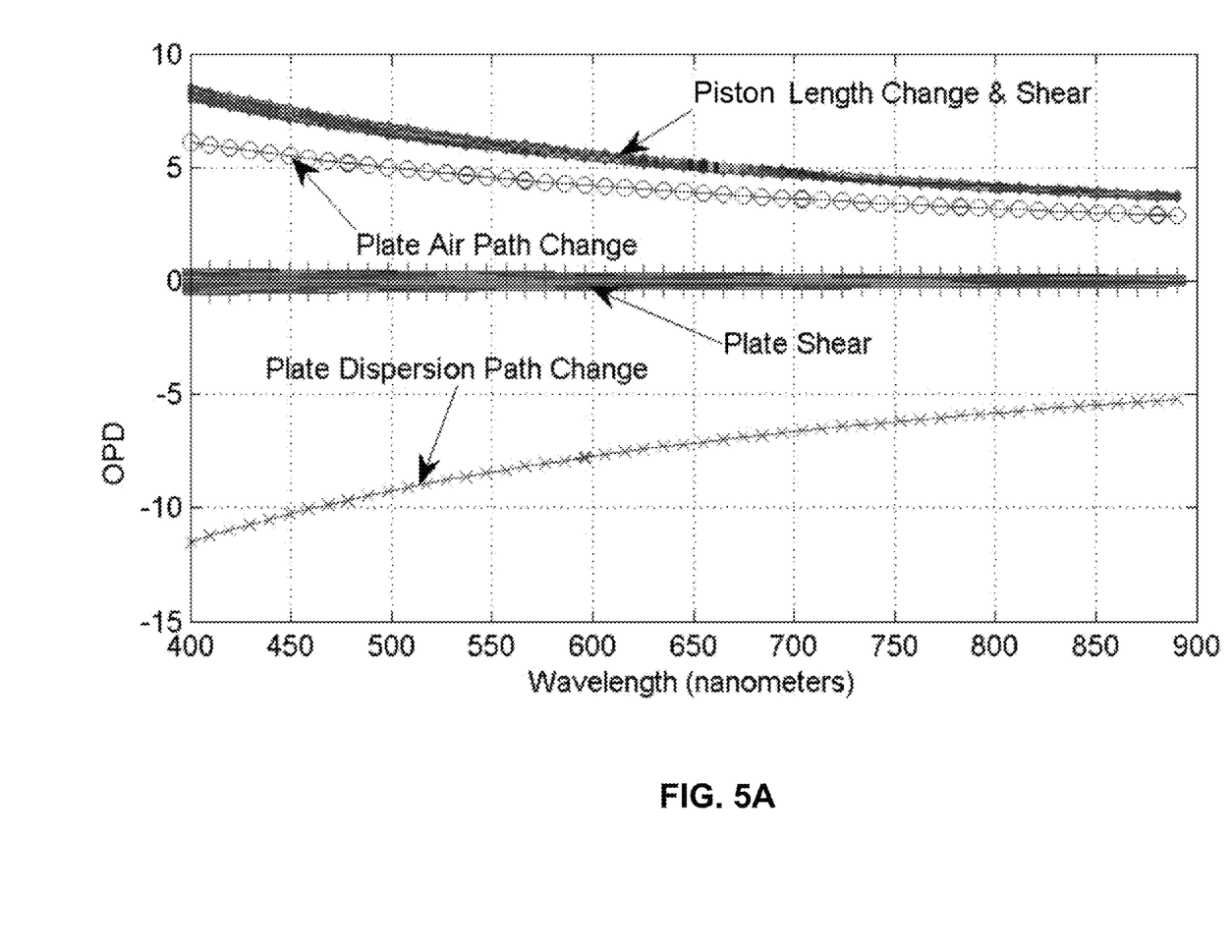
FIG. 5A is an exemplary plot showing different components of optical path difference for various field angles according to an aspect of the disclosure.
Figure 5B:
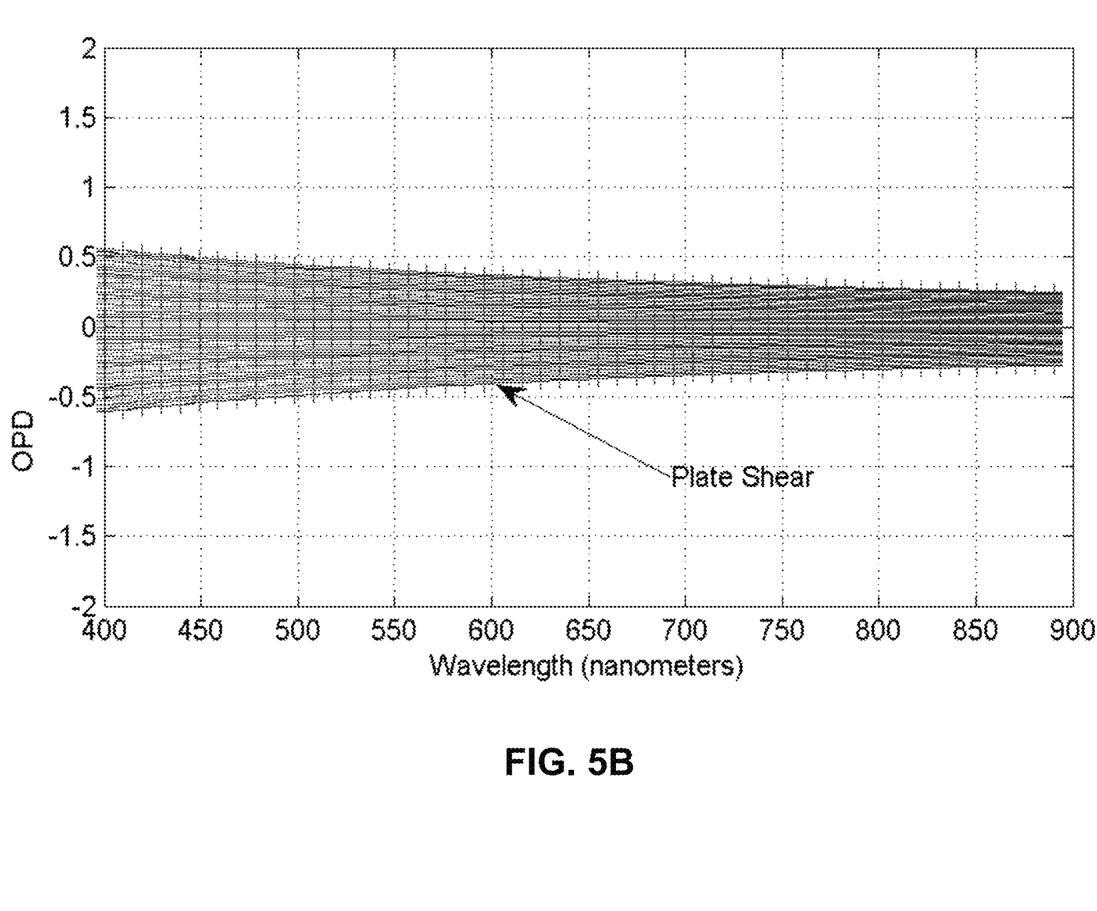
FIG. 5B shows a close-up view of a portion of FIG. 5A.

FIG. 5A is a plot showing the various terms for a nonzero OPD configuration as a function of wavelength for many different field angles. In FIG. 5A, the two terms associated with piston displacement are combined and the three terms associated with plate rotation (plate shear, plate dispersion path change, and plate air path change) are plotted separately. The plate shear is the most sensitive to field angle. This is evident in FIG. 5A, which shows that the plate shear term has the largest band or difference in OPD for the different field angles. FIG. 5B shows a close-up view of FIG. 5A focusing on the plate shear term.

In FIG. 5A, the piston shear term shows some sensitivity to field angle, but to a much lesser degree compared with the plate shear term. This sensitivity may be increased if the minor displacement is increased.

Thus, the plate shear is the primary cause of variation in the OPD as a function of field angle. This variation in OPD causes a variation in the filter function across the focal plane 140, resulting in the coloring across the focal plane 140 discussed above. A method for mitigating this coloring is discussed later.

This coloring across the focal plane 140 is exploited to measure the spectra of an object or scene. For the interferometric scanning spectrometer, the following parameters are known: 1) the electromagnetic intensity (pan-chromatic) on the focal plane 140 at the various field angles, and 2) the configuration of the interferometer which defines the filter function in Equation (1).

The electromagnetic intensity that impinges on the focal plane as a function of field angle is given by $$i(\theta_{fa}) = \int_{\lambda_{min}}^{\lambda_{max}} f s \, d\lambda \quad (11)$$

where s is the spectra of the source, i is intensity at the focal plane 140 as a function of the field angle, and $\lambda_{min}$ and $\lambda_{max}$ are the minimum and maximum wavelengths, respectively, that a detector can detect. Equation (11) can be discretized and written in matrix form to yield a linear system of equations as follows:

$$\begin{bmatrix} i^1 \\ i^2 \\ \vdots \\ i^n \end{bmatrix} = \begin{bmatrix} f_{\lambda_1}^1 & f_{\lambda_2}^1 & \cdots & f_{\lambda_m}^1 \\ f_{\lambda_1}^2 & f_{\lambda_2}^2 & \cdots & f_{\lambda_m}^2 \\ \vdots & & \ddots & \vdots \\ f_{\lambda_1}^n & f_{\lambda_2}^n & & f_{\lambda_m}^2 \end{bmatrix} \begin{bmatrix} s_1 \\ s_2 \\ \vdots \\ s_m \end{bmatrix} \quad (12)$$

where $i^n$ is the intensity detected by the $n^{th}$ detector of the sensor array 145 at the $n^{th}$ field angle, and the spectra of the source is discretized into a set of spectral bands $s_1$ to $s_m$. The above matrix relating the spectra to the intensity is the filter function matrix. In the filter function matrix, component $f_{\lambda_m}^n$ corresponds to the filter function at the $n^{th}$ field angle and a wavelength $\lambda_m$ corresponding to spectral band $s_m$. The condition of the filter function matrix is tunable by adjusting the plate rotation and/or the piston displacement, as discussed further below.

In order to capture the spectra of the source, the filter function matrix may be inverted. Therefore, m=n. This applies a constraint on the number of spectral bands m in that the number of spectral bands m can not be larger than the set of field angles n, similar to a grating spectrometer. There can be more sets of field angles than spectral bands (m<n) leading to a least-squares-fit solution. However, this would reduce the number of spectral bands. Equation (12) is linear, and therefore, all the attributes that follow from that fact apply such as uniqueness, etc. Writing the above equation in matrix notation gives:

$$\bar{I} = \bar{F}\bar{S} \quad (13)$$

where $$\bar{I} = \begin{bmatrix} i^1 \\ i^2 \\ \vdots \\ i^n \end{bmatrix},$$

-continued $$\tilde{F} = \begin{bmatrix} f_{\lambda_1}^1 & f_{\lambda_2}^1 & \cdots & f_{\lambda_m}^1 \\ f_{\lambda_1}^2 & f_{\lambda_2}^2 & \cdots & f_{\lambda_m}^2 \\ \vdots & & \ddots & \\ f_{\lambda_1}^n & f_{\lambda_2}^n & & f_{\lambda_m}^n \end{bmatrix}, \text{ and}$$

$$\overline{S} = \begin{bmatrix} s_1 \\ s_2 \\ \vdots \\ s_m \end{bmatrix}$$

The spectra $\overline{S}$ may be recovered from the intensity $\overline{I}$ by inverting the filter function matrix $\tilde{F}$. The equation to estimate the spectra is given by:

$$\overline{S}_{est} = \tilde{F}_{est}^{-1} \overline{I}. \qquad (14)$$

where $\overline{S}_{est}$ is the estimated spectra and $\tilde{F}_{est}^{-1}$ is the inverse of the filter function matrix $\tilde{F}$. The method for estimating the filter function matrix may be similar to that done by a grating spectrometer.

Figure 6:
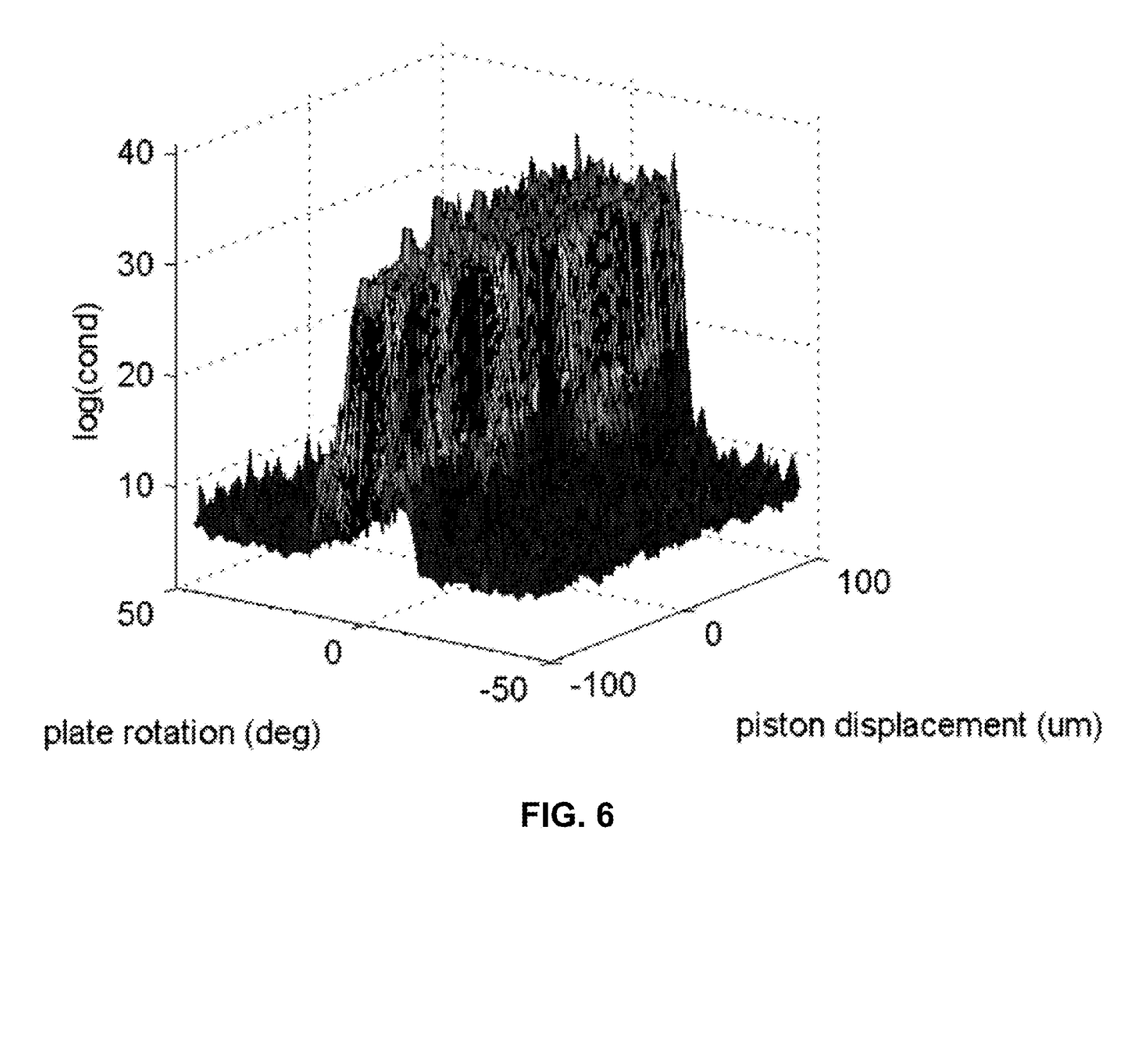
FIG. 6 is an exemplary plot showing a condition of a matrix as a function of piston displacement and plate rotation according to an aspect of the disclosure.

The interferometic scanning spectrometer can be utilized effectively to estimate spectra from the intensity $\overline{I}$ detected by the sensor array 145 when the filter function matrix can be inverted. This may be done by selecting a plate rotation and/or piston displacement that results in a filter function matrix that is well conditioned (i.e., invertible). FIG. 6 shows an example of the filter function matrix condition plotted as a function of plate rotation and piston displacement using Matlab®. In this case, the condition of the matrix is strongly dependent on the plate rotation and loosely dependent on the piston displacement. This is to be expected because the plate rotation angle is the root cause of the focal plane coloring, as discussed above. As shown in FIG. 6, the condition of the matrix is reasonable if the plate angle is greater than ~17 degrees.

Once the plate rotation angle and/or piston displacement is adjusted to obtain a well-conditioned filter function matrix, the filter function matrix $\tilde{F}$ may be calculated according to Equation (12). The inverse filter matrix $\tilde{F}_{est}^{-1}$ may then be obtained by inverting the filter function matrix $\tilde{F}$. The inverse filter matrix $\tilde{F}_{est}^{-1}$ may be stored in memory 155 coupled to the processor 150.

The spectrometer 105 may then be used to measure the spectra of an object or scene. In one aspect, the spectrometer 105 is a hybrid spectrometer that has the versatility of being used as a scanning spectrometer or a Fourier spectrometer. For the example of a scanning spectrometer, the object or scene may be scanned across the field of view of the spectrometer 105. The scan may be performed by moving the object across the field of view, by moving the spectrometer so that the entire field of view sweeps across the object, using a scanning mirror, or other known method. For the example of a Fourier spectrometer, the spectra of the object or scene may be measured by stepping the mirror $M_2$ to different positions along the axis 117 and collecting intensity data at each position.

The sensor array 140 is used to detect electromagnetic intensities on the focal plane 145 for the different field angles as the object or scene is scanned. In this example, n detectors $d_1$ to $d_n$ of the sensor array 145 may be used to detect the intensities $i^1$ to $i^n$, respectively, for the n field angles in the intensity matrix $\overline{I}$. Thus, the detected intensities from the detectors $d_1$ to $d_n$ for the different field angles correspond to the intensity matrix $\overline{I}$ shown in Equation (14). The processor 150 may then estimate the spectra for the object or scene based on the detected intensities for the different field angles and the inverse filter matrix $\tilde{F}_{est}^{-1}$ in accordance with Equation (14). The processor 150 may send the estimated spectra to an output device (e.g., display) and/or store the estimated spectra in the memory 155.

Advantages of the interferometic scanning spectrometer over a grating spectrometer will now be explained. In particular, consider a simplified grating spectrometer system of equations given below:

$$\begin{bmatrix} i^1 \\ i^2 \\ \vdots \\ i^n \end{bmatrix} = \begin{bmatrix} c_{\lambda_1} & 0 & \cdots & 0 \\ 0 & c_{\lambda_2} & \cdots & 0 \\ \vdots & & \ddots & \\ 0 & 0 & & c_{\lambda_m} \end{bmatrix} \begin{bmatrix} s_1 \\ s_2 \\ \vdots \\ s_m \end{bmatrix} \qquad (15)$$

where $c_{\lambda_m}$ the $m^{th}$ scale factor of the system that relates the amount of spectra at a particular wavelength band to an intensity at the $n^{th}$ detector. This simplified system is decoupled and invertible assuming that m=n as discussed previously. For example, assume a spectral source where there is a very strong absorption line, e.g., strong Fraunhofer line, and also assume that the line occurs on the $j^{th}$ detector ($i^j$). The $i^j$ detector should measure a "0" amount of electromagnetic intensity, but in actual fact the read out will be the value of the noise floor of that detector. This is a poor measurement or estimate of the source spectra. However, if the same source is measured by the interferometic scanning spectrometer, this is not the case. In the interferometic scanning spectrometer, all detectors see electromagnetic intensity from many different wavelengths and all detectors are well off the noise floor in general. The interferometic scanning spectrometer is not limited by the noise floor for detecting strong absorption lines.

The interferometric scanning spectrometer according to various aspects may provide at least the following advantages over a grating spectrometer:

In grating spectrometers, the $1^{st}$ order diffraction is approximately 20% throughput (averaged over all wavelengths) whereas the interferometric scanning spectrometer has a 35% throughput.

The efficiency curve for a grating spectrometers are undesirably very peaky and typically tuned around one wavelength whereas the interferometric scanning spectrometer efficiency is desirably very flat across the maximum and minimum wavelengths of the system, e.g., 400-900 nanometers. The maximum and minimum wavelengths of the system may be determined by the range of detectable wavelengths of the sensor array 145. Thus, the interferometric scanning spectrometer can estimate spectra over a broadband.

Higher spectral resolution over a small band can be obtained in the interferometric scanning spectrometer by placing a band pass filter in front of the focal plane—see Equation (15).

Figure 7:
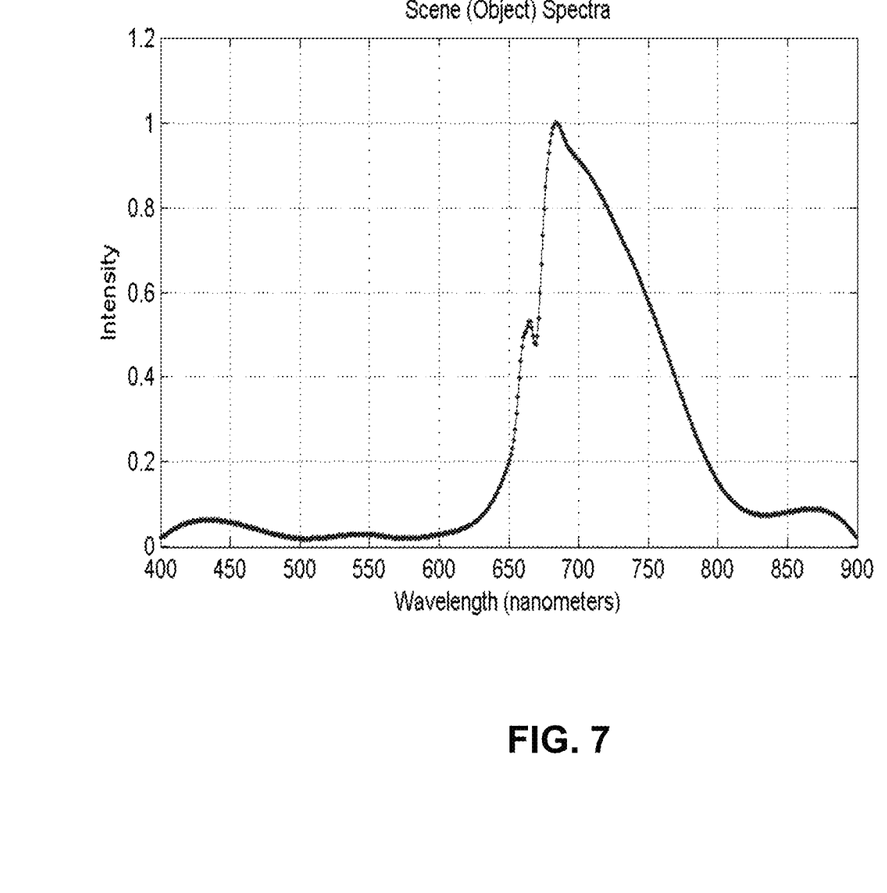
FIG. 7 is an exemplary plot showing a spectra of a scene.
Figure 8:
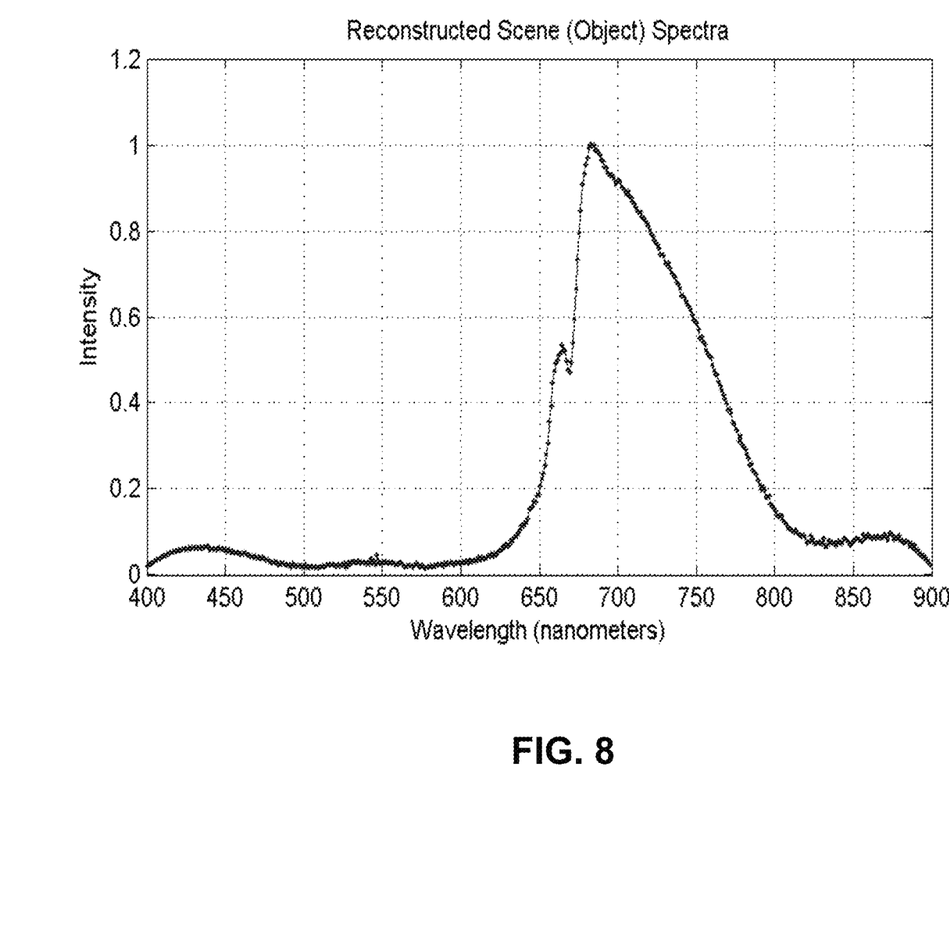
FIG. 8 is an exemplary plot showing a reconstructed spectra of the scene according to an aspect of the disclosure.
Figure 9:
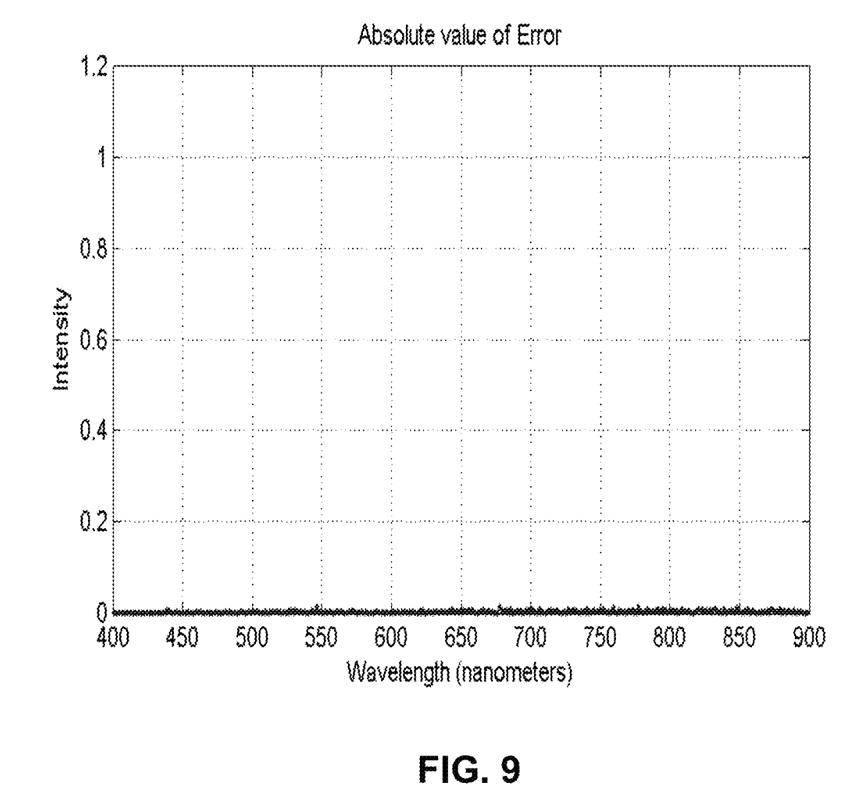
FIG. 9 is an exemplary plot showing an error between the reconstructed spectra and the spectra shown in FIG. 7.

The efficacy of the interferometic scanning spectrometer according to an aspect will now be discussed using an example of chlorophyll fluorescing. In this example, FIG. 7 shows a plot of a sample spectra of chlorophyll fluorescing. This sample was put into a model of the interferometric scanning spectrometer to obtain the reconstructed spectra shown in FIG. 8. FIG. 9 shows the error between the reconstructed spectra and the spectra in FIG. 7. From FIGS. 7-9, it is clear that the spectra has been reconstruction, and the errors are minimal. It should be noted that this reconstruction does not include sensor noise, etc. In other words, the reconstruction represents an ideal case.

The interferometer shown in FIG. 1 may be used for other applications besides estimating the spectra of an object or scene. For example, the interferometer may be used as an optical filter to block a broad range of wavelengths, as described by Palmer (U.S. Pat. No. 7,499,175). In this and other applications, it may be desirable to mitigate the coloring across the focal plane 140.

A method for mitigating the coloring across the focal plane 140 will now be discussed. The coloring across the focal plane can be mitigated by basically using the piston shear to compensate for plate shear. This is done by taking the partial derivative of the OPD with respect to the field angle $\theta_{fa}$ evaluated at $\theta_{fa}=0$ and setting the quantity equal to zero and solving for piston as a function of plate rotation angle. This can be expressed as:

$$\frac{\partial(OPD)}{\partial\theta_{fa}}\bigg|_{\theta_{fa}=0} \equiv 0, \quad (16)$$

and $$p=\Im_b(\lambda,\theta_{plt}) \quad (17)$$

where $\Im_b$ is a known function. However, the equation is still a function of wavelength $\lambda$, and therefore, piston position is not valid for all wavelengths. However, if a particular wavelength of interest is chosen or desired $\lambda_0$ such as a maximum or minimum similar to what was done in Palmer, then the above equations take the form:

$$\frac{\partial^2(OPD)}{\partial\theta_{fa}\partial\lambda}\bigg|_{\theta_{fa}=0,\lambda=\lambda_0} \equiv 0, \quad (18)$$

and $$p=\Im_c(\theta_{plt}) \quad (19)$$

where $\Im_c$ is a known function. There is a direct relationship between piston displacement and plate rotation giving minimal coloring across the focal plane. It should be noted that coloring will occur even if the plate is not rotated due strictly to the piston shear.

The description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A tunable interferometric scanning spectrometer, comprising:
    an optical structure configured to split incoming light beams into first light beams and second light beams that propagate along a first optical path and a second optical path, respectively, wherein the first and second optical paths are different, and to combine the first light beams and the second light beams directed back to the optical structure from the first optical path and the second optical path, respectively, to produce combined light beams;
    a first dispersive element in the first optical path, the first dispersive element being orientated at an angle;
    a mirror in the second optical path, the mirror being placed at a position along an axis of the second optical path, wherein the angle of the first dispersive element and the position of the mirror result in a filter function matrix that is invertible, wherein the filter function matrix is derived by calculating a filter function at different field angles and different wavelengths;
    a sensor array configured to detect intensities of the combined light beams across a focal plane; and
    a processor configured to calculate a spectra based on the detected intensities from the sensor array and the filter function that is a function of optical path difference (OPD) between the first and second optical paths.

2. The interferometric scanning spectrometer of claim 1, wherein the filter function is given by:

$$f(OPD)=\frac{1}{2}[1+\cos(2\pi OPD)]$$

where $f(OPD)$ is the filter function.

3. The interferometric scanning spectrometer of claim 1, further comprising a second dispersive element in the second optical path.

4. The interferometric scanning spectrometer of claim 3, wherein each of the first and second dispersive elements comprises a glass plate.

5. The interferometric scanning spectrometer of claim 3, wherein the angle at which the first dispersive element is orientated is an angle of 10 degrees or greater with respect to an angle corresponding to zero OPD.

6. The interferometric scanning spectrometer of claim 3, wherein the first dispersive element is rotatable.

7. The interferometric scanning spectrometer of claim 3, further comprising a mirror in the first optical path.

8. The interferometric scanning spectrometer of claim 1, wherein the optical structure comprises a beam splitter.

9. The interferometric scanning spectrometer of claim 1, wherein the filter function varies across the focal plane.

10. The interferometric scanning spectrometer of claim 9, wherein the sensor array comprises a plurality of photodetectors, wherein each of the plurality of photodetectors detects an intensity of the combined light beams for a different field angle.

11. The interferometric scanning spectrometer of claim 10, wherein the processor is configured to calculate the spectra by multiplying the detected intensities from the sensor array with the inverse of the filter function matrix.

12. A method for estimating a spectra of an object or scene, comprising:

receiving incoming light beams from the object or scene;

splitting the incoming light beams using an optical structure into first light beams and second light beams that propagate along a first optical path and a second optical path, respectively, wherein the first and second optical paths are different, and wherein there is a first dispersive element orientated at an angle in the first optical path and a mirror placed at a position along an axis of the second optical path, wherein the angle of the first dispersive element and the position of the mirror result in a filter function matrix that is invertible, wherein the filter function matrix is derived by calculating a filter function at different field angles and different wavelengths;

combining the first light beams and the second light beams directed back to the optical structure from the first optical path and the second optical path, respectively, to produce combined light beams;

detecting intensities of the combined light beams across a focal plane; and calculating the spectra based on the detected intensities of the combined light beams and the filter function that is a function of optical path difference (OPD) between the first and second optical paths.

13. The method of claim 12, wherein the filter function is given by:

$$f(OPD)=\tfrac{1}{2}[1+\cos(2\pi OPD)]$$

where $f(OPD)$ is the filter function.

14. The method of claim 12, wherein there is a second dispersive element in the second optical path.

15. The method of claim 14, wherein each of the first and second dispersive elements comprises a glass plate.

16. The method of claim 14, wherein the angle at which the first dispersive element is orientated is an angle of 10 degrees or greater with respect to an angle corresponding to zero OPD.

17. The method of claim 14, wherein there is a first mirror in the first optical path.

18. The method of claim 12, wherein the filter function varies across the focal plane.

19. The method of claim 18, wherein detecting intensities of the combined light beams across the focal plane comprises:

detecting the intensities across the focal plane with a sensor array comprising a plurality of photodetectors, wherein each of the plurality of photodetectors detects an intensity of the combined light beams for a different field angle.

20. The method of claim 19, wherein calculating the spectra comprises:

multiplying the detected intensities from the sensor array with the inverse of the filter function matrix, wherein the filter function matrix is derived by calculating the filter function at different field angles and different wavelengths.

* * * * *